Patented Sept. 5, 1922.

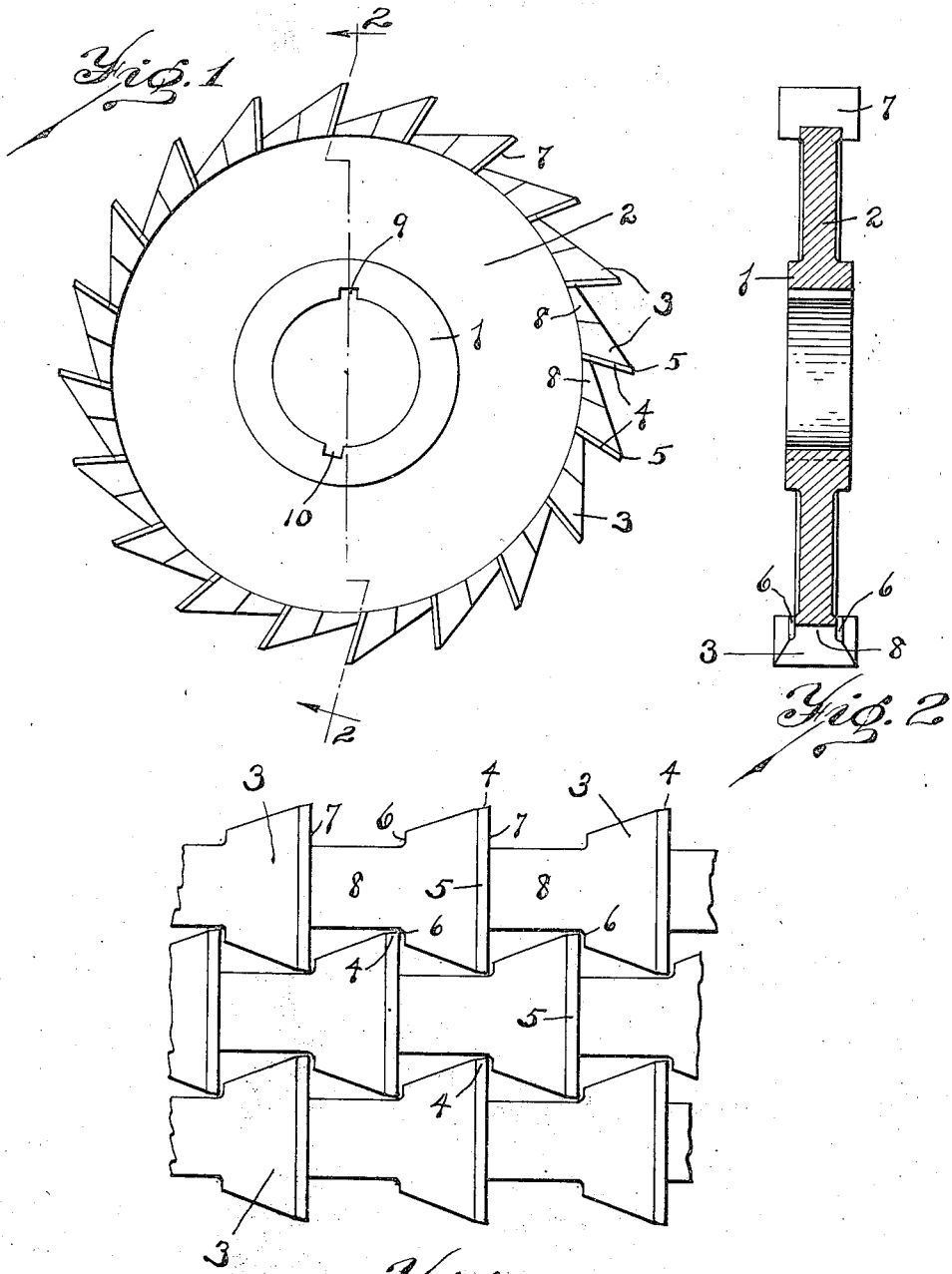

1,428,308

UNITED STATES PATENT OFFICE.

FREDERICK WIARD, OF DETROIT, MICHIGAN, ASSIGNOR TO AMERICAN STANDARD TOOL COMPANY, OF DETROIT, MICHIGAN, A CORPORATION OF MICHIGAN.

MILLING CUTTER.

Application filed June 4, 1921. Serial No. 475,014.

*To all whom it may concern:*

Be it known that I, FREDERICK WIARD, a citizen of the United States, and residing at Detroit, in the county of Wayne and State of Michigan, have invented a new and Improved Milling Cutter, of which the following is a specification.

This invention relates to milling cutters having teeth adapted to cut along their longitudinal top and side edges, and its object is to provide tools of this character which can be placed side by side upon a shaft and used for cutting wide grooves and at the same time finish the sides of the grooves.

This invention consists in a milling cutter having teeth extending longitudinally from at least one side of the cutter and which teeth have their rear portions cut away in such a manner that when a similar cutter is placed in contact with the first on the same shaft, the teeth of the two cutters will overlap to such an extent as to permit regrinding of the side edges of the teeth.

This invention further consists in the details of construction illustrated in the accompanying drawing and particularly set forth in the hereto annexed claims.

In the drawing, Fig. 1 is a side elevation of one of my improved milling cutters. Fig. 2 is a section on the line 2—2 of Fig. 1. Fig. 3 is a development of a series of teeth of three adjacent milling cutters.

Similar reference characters refer to like parts throughout the several views.

The milling cutter shown in Figs. 1 and 2 has a hub 1, a web 2 and teeth 3 whose length is greater than that of the hub. These teeth have the usual cutting side edges 4 and longitudinal top edges 5 and these teeth taper back to shoulders 6 as indicated in Fig. 3. I prefer that the remainder of the teeth from the shoulder 6 to the faces 7 of adjacent teeth shall be parallel and the width of these parts 8 shall be such that when similar cutters are placed side by side on the same shaft with their hubs 1 in engagement the side cutting edges 4 of the several teeth will not engage the back portions 8 of these teeth, that is, there will be clearance between the side cutting edges 4 of the teeth of the several cutters and the rear portions 8 of the teeth of the adjacent cutters. It will be understood that the present cutters are adapted for the ordinary purposes for which the usual side-milling cutters are constructed, but the possibility of nesting these cutters is the object of the present invention.

When the cutters and their teeth are positioned as indicated in Fig. 3, the united cutters are adapted for smoothing extended surfaces and for cutting wide grooves, and the outer side edges of the teeth of the outer cutters are adapted to finish the sides of the grooves in the work. As these side edges wear, they can be reground and in order to retain a tool of sufficient width, thin washers may be placed between the hubs 1 of the adjacent cutters until the desired overall width is obtained. As indicated in Fig. 3, considerable grinding is possible before the teeth of the adjacent cutters no longer overlap.

One advantage of the side-cutting edges on the inner sides of the teeth of cutters which are grouped as shown in Fig. 3 is that each tooth cuts free the shaving it removes along all three edges and thus reduces the power necessary to drive the cutter. As the heaviest wear comes on the outer corners of the teeth of the outer cutters, the present arrangement permits the outer and inner cutters to be exchanged so as to provide new sets of teeth with sharp corners whenever those in use become worn without the necessity of procuring additional cutters or regrinding the original outer cutters. This permits work to be carried on without serious interruption until practically all the cutting edges are worn. When then reground, these cutters will again have the same number of cutting edges as they had originally.

As shown in Fig. 1, I have formed the hub 1 of the cutter with the keyways 9 and 10 spaced apart the angular distance between any two teeth plus one half the angular distance between adjacent teeth, so that when the cutters are arranged as shown in Fig. 3, alternate cutters will use the keyways 9 and the others the keyways 10 in order to obtain the positions shown in Fig. 3. This brings the longitudinal top edges 5 of the teeth of each cutter midway between the same edges of the teeth of the adjacent cutter and it also insures clearance between the corners of these teeth and the shoulder 6 of the adjacent cutter. As these cutters are to be grouped interchangeably, the width of the part 8 plus the width of the face 7 should be less than twice the length of the hub 1.

While I have shown a well known cutter tooth, I do not wish to be limited thereto, as the invention resides entirely in providing the proper clearance by forming the backs of the cutter teeth sufficiently narrow. While I have shown the parts 8 of these teeth with parallel sides, it is evident that this is not necessary as these teeth may be cut away in any other desired manner so long as proper clearance is afforded, and these details, as well as those of the other parts of the cutter, may all be changed by those skilled in the art without departing from the spirit of my invention as set forth in the following claims.

I claim:—

1. Milling cutters, each having side-cutting teeth, all of the same shape and size, and having the sides of the teeth back of their cutting edges so cut away as to permit the faces of the teeth of adjacent cutters to overlap circumferentially.

2. A milling cutter comprising a circular web and a ring of cutting teeth on the web, the teeth tapering back from the side edges to shoulders substantially midway between the faces of adjacent teeth, the sides of the teeth between said shoulders and adjacent teeth being parallel.

3. A milling cutter comprising a hub, a circular web and a ring of cutting teeth on the web, the hub having a central bore and two longitudinal keyways spaced apart the angular distance between two selected teeth plus one half the angular distance between two adjacent teeth.

4. Milling cutters, each having side-cutting teeth, all of the same shape and size, and having the sides of the teeth back of their cutting edges so cut away as to permit the faces of the teeth of adjacent cutters to overlap circumferentially, the faces of the teeth of one cutter being positioned midway between the faces of the teeth of the next adjacent cutters.

5. Milling cutters axially arranged with the tops of the teeth of alternate cutters alined and the tops of the teeth of adjacent cutters overlapping circumferentially and all the teeth of each cutter being alike.

6. Milling cutters axially arranged and each having both sides of its teeth provided with side-cutting edges, the sides of said teeth being so cut away as to permit the tops of the teeth of adjacent cutters to extend across the same plane and all the teeth of each cutter being alike.

FREDERICK WIARD.